US012803332B2

(12) United States Patent
Schlager et al.

(10) Patent No.: US 12,803,332 B2
(45) Date of Patent: Nov. 17, 2026

(54) POWER ADJUSTMENT IN A NON-REGULATED WIRELESS CHARGING SYSTEM

(71) Applicant: RENESAS DESIGN AUSTRIA GMBH, Graz (AT)

(72) Inventors: Tobias Schlager, Graz (AT); Michael Pieber, Graz (AT); Alessandro Goitre, Graz (AT); Francesco Antonetti, Graz (AT)

(73) Assignee: RENESAS DESIGN AUSTRIA GMBH, Graz (AT)

( * ) Notice: Subject to any disclaimer, the term of this patent is extended or adjusted under 35 U.S.C. 154(b) by 715 days.

(21) Appl. No.: 18/264,229

(22) PCT Filed: Jan. 31, 2022

(86) PCT No.: PCT/EP2022/052228
§ 371 (c)(1),
(2) Date: Aug. 3, 2023

(87) PCT Pub. No.: WO2022/167369
PCT Pub. Date: Aug. 11, 2022

(65) Prior Publication Data

US 2024/0039336 A1 Feb. 1, 2024

(30) Foreign Application Priority Data

Feb. 4, 2021 (EP) .................................... 21155158

(51) Int. Cl.
*H02J 50/12* (2016.01)
*H02J 7/42* (2026.01)
(Continued)

(52) U.S. Cl.
CPC .............. *H02J 50/12* (2016.02); *H02J 50/10* (2016.02); *H02J 50/80* (2016.02); *H02J 7/42* (2026.01); *H02J 50/70* (2016.02); *H04B 5/266* (2024.01)

(58) Field of Classification Search
CPC .......... H02J 7/00034; H02J 7/42; H02J 50/10; H02J 50/12; H02J 50/70; H02J 50/80; H04B 5/266
(Continued)

(56) References Cited

U.S. PATENT DOCUMENTS 11,201,493 B2 * 12/2021 Eftimie ................... H02J 50/05
11,909,426 B2 * 2/2024 Jongsma ............. H01Q 1/2208
(Continued)

FOREIGN PATENT DOCUMENTS

WO 2015/080517 A1 6/2015

OTHER PUBLICATIONS

International Search Report and Written Opinion, mailed Jun. 7, 2022, from PCT/EP2022/052228.

*Primary Examiner* — Drew A Dunn
*Assistant Examiner* — Daniel P Mcfarland
(74) *Attorney, Agent, or Firm* — Workman Nydegger

(57) ABSTRACT

A system including a power device for wireless charging of a battery of a portable device, and the power device has an antenna to emit a magnetic field with a carrier frequency to power the portable device which includes an antenna exposed to the magnetic field and connected via a matching stage to a rectifier stage, to rectify an antenna signal, and the portable device comprises a charge stage, to sense and limit the rectified antenna signal. The portable device includes a detuning stage to change the resonance frequency of the antenna of the portable device and that the charge stage is configured to limit the input voltage ($U_I$) for the charger IC
(Continued)

STATE OF THE ART by steering the detuning stage to detune the resonance frequency of the antenna of the portable device away from the carrier frequency of the magnetic field.

9 Claims, 3 Drawing Sheets

(51) Int. Cl.
*H02J 50/10* (2016.01)
*H02J 50/70* (2016.01)
*H02J 50/80* (2016.01)
*H04B 5/26* (2024.01)

(58) Field of Classification Search
USPC ..... 307/104; 320/108
See application file for complete search history.

(56) References Cited

U.S. PATENT DOCUMENTS 11,949,229 B2* 4/2024 Mehas ..... H02H 9/04
12,155,239 B2* 11/2024 Gruber ..... H02J 50/005
12,431,787 B2* 9/2025 Hora ..... H02M 1/14
12,519,390 B2* 1/2026 De Cremoux ..... H02M 1/14
12,640,596 B2* 5/2026 Sautto ..... H02J 50/80
12,658,736 B2* 6/2026 Reyes ..... H02J 50/20
12,671,256 B2* 6/2026 Nibir ..... H02J 7/02
2007/0249398 A1* 10/2007 Watanabe ..... G06K 7/0008 455/333
2009/0309547 A1* 12/2009 Nakatsuji ..... H01M 10/441 320/164
2010/0084918 A1* 4/2010 Fells ..... G01V 3/10 307/32
2010/0244576 A1* 9/2010 Hillan ..... G06K 19/0702 343/745
2011/0053500 A1* 3/2011 Menegoli ..... H02J 50/12 455/41.1
2011/0181119 A1* 7/2011 Ishibashi ..... H02J 50/80 307/104
2012/0104867 A1* 5/2012 Mudrick ..... H02J 50/12 307/104
2012/0293900 A1* 11/2012 Kim ..... H02J 50/12 361/87
2012/0319646 A1* 12/2012 Kamata ..... H02J 50/12 320/108
2013/0062959 A1* 3/2013 Lee ..... H02J 50/12 307/104
2013/0099585 A1* 4/2013 Von Novak ..... H01F 38/14 307/104
2013/0099734 A1* 4/2013 Lee ..... H02J 50/12 320/108
2013/0176652 A1* 7/2013 Kim ..... H02H 3/20 361/86
2013/0176653 A1* 7/2013 Kim ..... H02H 9/028 361/91.1
2013/0249479 A1* 9/2013 Partovi ..... H02J 50/005 320/108
2013/0334896 A1* 12/2013 Yamamoto ..... H01F 38/14 307/104
2013/0335050 A1* 12/2013 Fujiwara ..... H02M 3/1588 323/283
2014/0028107 A1* 1/2014 Kwon ..... H02J 50/12 307/104
2014/0057575 A1* 2/2014 Ayukawa ..... G05F 1/10 455/73
2014/0145504 A1* 5/2014 Kayama ..... H02J 50/10 307/23
2014/0145675 A1* 5/2014 Shimizu ..... H02J 50/10 320/108
2014/0239889 A1* 8/2014 Endo ..... H02J 50/10 320/108
2014/0266019 A1* 9/2014 Pigott ..... H02J 50/12 320/108
2014/0285141 A1* 9/2014 Lee ..... H02J 50/12 320/108
2014/0368050 A1* 12/2014 Chun ..... H02J 4/25 307/104
2014/0375137 A1* 12/2014 Ichikawa ..... H02J 50/12 307/104
2015/0008755 A1* 1/2015 Sone ..... H02J 50/12 307/104
2015/0028801 A1* 1/2015 Carobolante ..... H02J 50/60 320/108
2015/0137611 A1* 5/2015 Huang ..... H02J 50/10 307/104
2015/0214748 A1* 7/2015 Lin ..... H02J 50/80 307/104
2015/0233987 A1* 8/2015 Von Novak, III ..... H02J 50/12 324/701
2015/0239355 A1* 8/2015 Oshida ..... B60L 3/12 320/108
2015/0263531 A1* 9/2015 Kozakai ..... H02J 50/10 307/104
2015/0340881 A1* 11/2015 Nakano ..... H02J 50/12 307/104
2016/0020636 A1* 1/2016 Khlat ..... H02J 50/001 320/108
2016/0020637 A1* 1/2016 Khlat ..... H02J 50/10 320/108
2016/0079799 A1* 3/2016 Khlat ..... H02J 50/20 320/108
2016/0141882 A1* 5/2016 Ichikawa ..... H02J 50/12 307/104
2016/0156231 A1* 6/2016 Shibuya ..... H02J 50/12 455/82
2016/0181856 A1* 6/2016 Lee ..... H02J 50/10 320/108
2016/0197513 A1* 7/2016 Uchimoto ..... H02J 50/10 320/108
2016/0254679 A1* 9/2016 Liu ..... H02J 50/12 307/104
2017/0005466 A1* 1/2017 Nakano ..... G06F 1/28
2017/0025882 A1* 1/2017 Chien ..... H02J 7/92
2017/0025897 A1 1/2017 Menegoli
2017/0093217 A1* 3/2017 Cho ..... H02J 50/12
2018/0026455 A1* 1/2018 Kano ..... H02J 7/50 320/112
2018/0123397 A1* 5/2018 Tsukiyama ..... H02J 50/12
2018/0131234 A1* 5/2018 Uchimoto ..... G05F 1/46
2018/0159371 A1* 6/2018 Kim ..... H02J 50/10
2018/0212463 A1* 7/2018 van Boheemen ..... B60L 53/122
2018/0272130 A1 9/2018 Meskens et al.
2018/0337558 A1* 11/2018 Muramatsu ..... H02J 50/05
2019/0097448 A1 3/2019 Partovi
2019/0148967 A1* 5/2019 Bae ..... H02J 50/12 320/108
2019/0312525 A1* 10/2019 Nakao ..... H01F 38/14
2019/0334367 A1 10/2019 Scott et al.
2020/0076249 A1* 3/2020 Mao ..... H02J 50/12
2020/0161907 A1* 5/2020 Yang ..... H02J 50/10
2020/0177013 A1* 6/2020 Wang ..... H02J 50/80
2020/0203979 A1* 6/2020 Jiang ..... H02J 50/10
2020/0203980 A1* 6/2020 Lee ..... H02J 50/10
2020/0287382 A1* 9/2020 Gao ..... H02J 50/10
2020/0343720 A1* 10/2020 Gu ..... H02H 9/04
2022/0360110 A1* 11/2022 Gu ..... H02J 50/12
2022/0368170 A1* 11/2022 Shin ..... H02J 50/12
2023/0040473 A1* 2/2023 Gu ..... H01F 38/14
2023/0065766 A1* 3/2023 Pei ..... H02J 50/12
2023/0100393 A1* 3/2023 Shi ..... H02J 50/10 307/104
2023/0146055 A1* 5/2023 Park ..... G01R 19/16576 307/104
2024/0039344 A1* 2/2024 Schlager ..... H02J 50/10
2024/0322590 A1* 9/2024 Nibir ..... H02J 7/02
2025/0055326 A1* 2/2025 Shimura ..... H02J 50/80
2025/0112503 A1* 4/2025 Kang ..... H02J 50/12
2025/0112504 A1* 4/2025 Reyes ..... H02J 50/20
2025/0141275 A1* 5/2025 Sautto ..... H03K 17/296
2025/0202251 A1* 6/2025 Sautto ..... H02J 7/62

(56) References Cited

U.S. PATENT DOCUMENTS

| | | | | |
|---|---|---|---|---|
| 2025/0309692 | A1* | 10/2025 | Paz | H02J 50/12 |
| 2025/0309693 | A1* | 10/2025 | Takahashi | H02J 50/12 |
| 2026/0189075 | A1* | 7/2026 | Jongsma | H02J 50/10 |

* cited by examiner

STATE OF THE ART

POWER ADJUSTMENT IN A NON-REGULATED WIRELESS CHARGING SYSTEM

FIELD OF THE INVENTION

The present invention relates to a system of a power device and a portable device for wireless charging of a battery of the portable device, which power device comprises an antenna to emit a magnetic field with a carrier frequency to power the portable device which comprises an antenna exposed to the magnetic field and connected via a matching stage to a rectifier stage, to rectify an antenna signal, and which portable device comprises a charge stage, to sense and limit the rectified antenna signal, to provide an input voltage at an input pin of a charger IC of the portable device that provides a first charge current at an output pin connected to the battery to charge the battery for a first period of time as power source with the constant first charge current, and wherein the portable device comprises a detuning stage to change the resonance frequency of the antenna of the portable device and that the charge stage is built to limit the input voltage for the charger IC by steering the detuning stage to detune the resonance frequency of the antenna of the portable device away from the carrier frequency of the magnetic field.

BACKGROUND OF THE INVENTION

Wireless charging is used for all kind of different portable devices like a mobile phone or earphones. The portable device just has to be dropped close-by a power device that generates and radiates a magnetic field via an antenna of the power device with the advantage that no wire is needed to charge the portable device. In some of these systems, the power device just radiates the magnetic field and some newer systems comprise a feedback loop from the portable device to the power device to regulate the power of the magnetic field.

FIG. 1 shows such a system of a power device 1 and a portable device 2 with a battery 3, know to a person skilled in the art. Such a system is for instance described in the NFC Forum™ Technical Specification Version 1.0. The power device 1 called "poller" comprises an antenna 4 that radiates a magnetic field with the carrier frequency of 13.56 MHz. The portable device 2 called "listener" comprises an antenna 5 exposed to the magnetic field emitted by the power device 1. A matching circuit 15 matches the impedance of the output pins of the antenna 5 to input pins of a rectifier 6 that uses a bridge rectifier to rectify the antenna signal and to provide a DC voltage. A charge stage 7 of the portable device 2 is used to charge the battery 3. As the charge stage 7 comprises a charger IC 8 that needs a power voltage of 5V+/−10% as input voltage $U_I$, a DC/DC converter and limiter 9 is used to sense the DC voltage provided by rectifier 6 to limit it to provide the appropriate input voltage $U_I$ at an input pin 10 of charger IC 8.

Battery 3 is a Li-Ion battery that needs to be charged by charge stage 7 in different time periods with different charge currents $I_C$ and charge voltages. Charge stage 7 furthermore comprises a digital control stage 13 that generates a power adjustment information 16 in case the input voltage $U_I$ at input pin 10 and/or the charge current $I_C$ to charge the battery 3 are too low or too high. Such power adjustment information 16 is provided by the digital control stage 13 to a Cless Communication stage 14, which complies to the NFC communication protocol to communicate the power adjustment information 16 to the power device 1. With this feedback loop from portable device 2 to power device 1, charge stage 7 can request more or less power in the magnetic field provided by the power device 1.

FIG. 2 shows a time diagram of the charge current Ic in two different time periods T1 and T2 to load battery 3. FIG. 2 furthermore shows the actual battery voltage $U_{BAT}$ and the input voltage $U_I$ at input pin 10 of charge IC 8 during the time periods T1 and T2 to load battery 3 and during a ramp-up period TR to ramp-up from the constant first charge current Ic in the first time period T1 to the higher constant second charge current Ic in the second time period T2. FIG. 2 furthermore shows power $P_L$ generated in the portable device 2 from the magnetic field to load battery 3, which power $P_L$ more or less can be calculated as $P_L=U_I*I_C$ and FIG. 2 shows power $P_P$ generated by the power device 1 in the magnetic field. Lowest block of FIG. 2 shows power adjustment information 16 from the portable device 2 to the power device 1 to increase the power $P_P$ generated by the power device 1 in the magnetic field at the end of time period T1.

As shown in FIG. 2, battery 3 is loaded by charger IC 8 with constant first charge current Ic during the first time period T1 until $U_{BAT}$ reaches a particular voltage. From this time on Li-Ion battery 3 may be loaded with the higher second charge current Ic in the second time period T2 until $U_{BAT}$ reaches a target voltage and loading switches in a third time period to constant voltage charging. At the end of the first time period T1 charge stage 7 ramps-up the charge current Ic what reduces the input voltage $U_I$ as power $P_L$ generated in the portable device 2 is not enough to load battery 3 in the second time period T2 with the high second charge current Ic. Charge stage 7 therefore transmits a power adjustment information 16 to power device 1 to increase the power $P_P$ generated by the power device 1 in the magnetic field. As this feedback loop takes some time to have effect for charge IC 8, input voltage $U_I$ drops furthermore and reaches a $V_{reset\ charger}$ voltage level, what leads to a power-off reset of the charger IC 8 due to too low input voltage $U_I$. Charging of battery 3 therefore is interrupted for a short period of time, as can be seen in the drop of charge current Ic at the beginning of transition period TR, what is a disadvantage.

Due to the upfront communication of power adjustment information 16, the power device 1 increases its output power $P_P$ at the beginning of transition period TR. Within portable device 2 this increased power $P_L$ leads to an increase of the junction temperature TL, because the high power has to be burnt internally until the charge state will leave the reset state and come to the point where it is switching again to the high second charge current Ic. After this transition time TR the junction temperature TL within the portable device 2 will decrease again, because most of the power is delivered to the battery 3. The high junction temperature TL while the transition period TR can cause problems, because it might exceed the maximum allowed junction temperature TL of the portable device 2, what is a disadvantage.

US 2017/0025897 A1 discloses a system of a power device and a portable device and which power device is configured to wirelessly charge the battery of the portable device. The portable device comprises a charger stage to charge the battery with the energy from the rectified antenna signal of the antenna of the portable device. For maximal power transfer a matching stage tunes the antenna in resonance and the charge stage is configured to steer a detuning stage to detune the resonance of the antenna of the portable device away from the carrier frequency of the magnetic field to limit the rectified antenna signal as input voltage of the charger stage. This known system provides the disadvantage that the portable device may only detune the antenna to reduce the power transferred from the power device, but may not request more power if needed to charge the battery.

US 2019/334367 A1 discloses a similar system as described above, but with more than one receiver. Several of these receivers receive power in a wireless manner and simultaneously to charge the battery of the portable device with more power.

US 2018/272130 A1 discloses the transmission of a request by a receiver of such a system to interrupt power transmission at the power device simultaneously with detuning.

Furthermore WO 2015/080517 A1 and US 2019/097448 A1 disclose to charge a battery wireless.

SUMMARY OF THE INVENTION

It is an object of the invention to provide a system of a power device and a portable device with a charger IC for wireless charging of the battery of the portable device to avoid an substantial increase of the junction temperature TL of the portable device during the transition period TR.

This object is achieved in a system according to claim 1.

This inventive concept enables that the portable device dynamically changes the resonance frequency of its antenna to take more or less power from the magnetic field generated by the power device during the process to load the battery of the portable device. As substantially only the amount of power needed to load the battery during the different charge phases of the battery is take from the magnetic field, there is less or no waste power in the portable device that needs to be transformed into heat. It is furthermore possible to reduce the PCB size, because there is no need to achieve such a low temperature coefficient to get rid of the heat compared to the state of the art solution.

The feedback loop enables to steer the power device to generate more or less power in the magnetic field. As this feedback loop takes some time to take effect with more or less power $P_L$ generated within the portable device, the inventive detuning provides a big advantage to dynamically reduce the power taken from the magnetic field during a change of the power in the magnetic field.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 1:
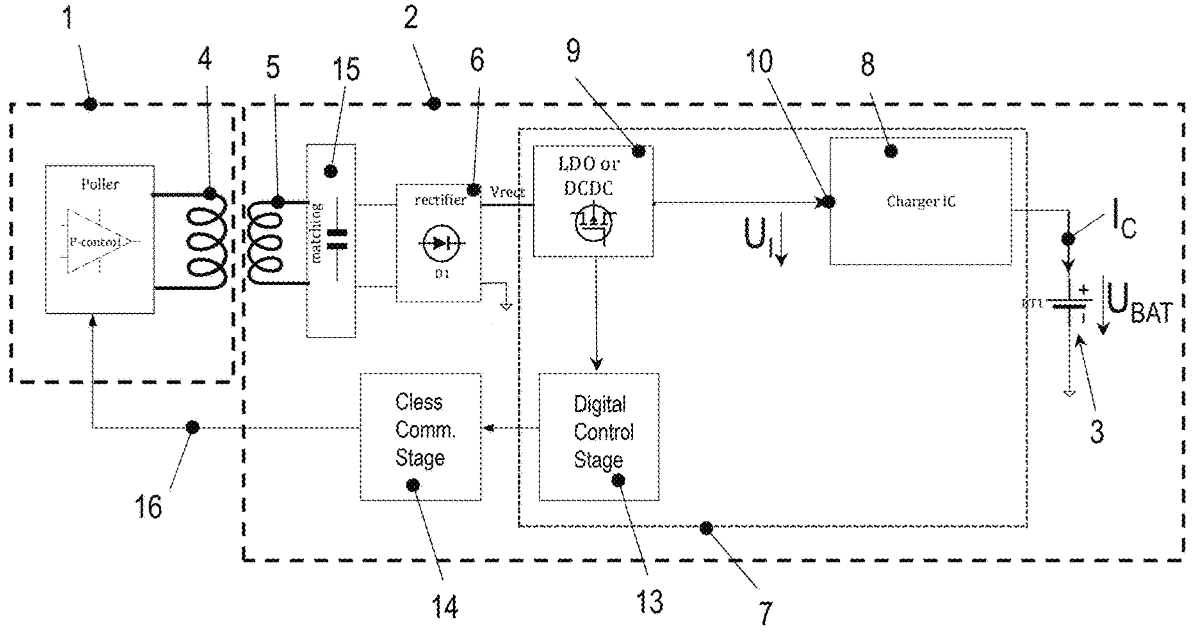
FIG. 1 shows a system known to a person skilled in the art, which system comprises a power device and a portable device with charger IC to charge a battery wireless.
Figure 2:
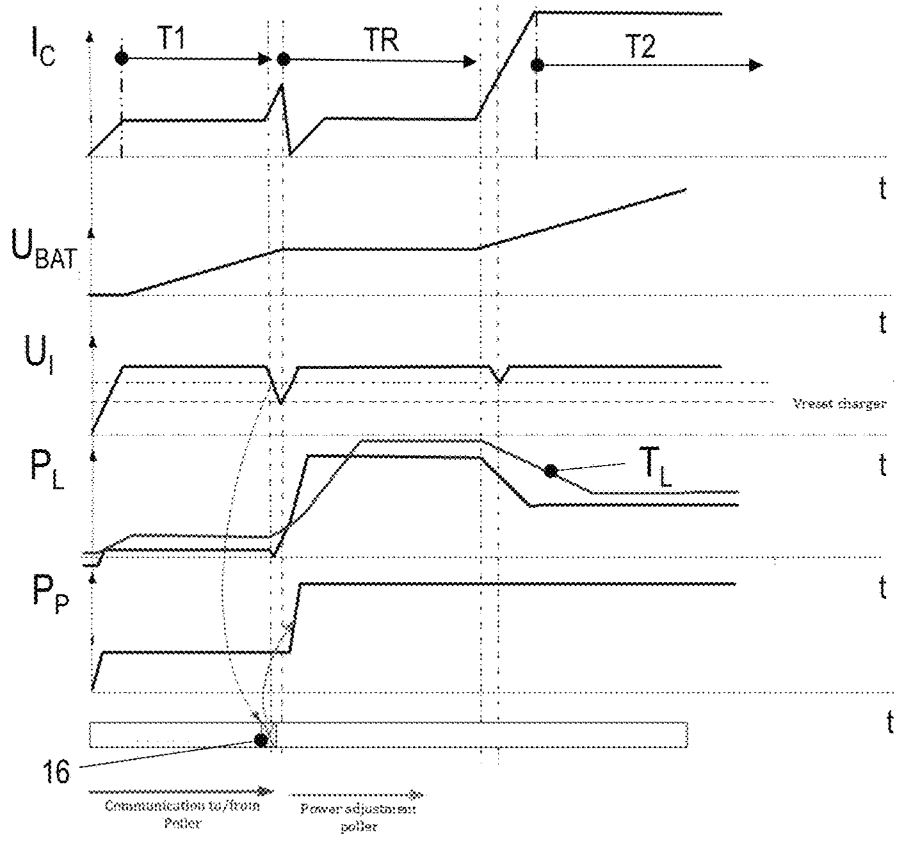
FIG. 2 shows a time diagram of the charge current and other parameters to charge the battery of the portable device of the system according to FIG. 1.
Figure 3:
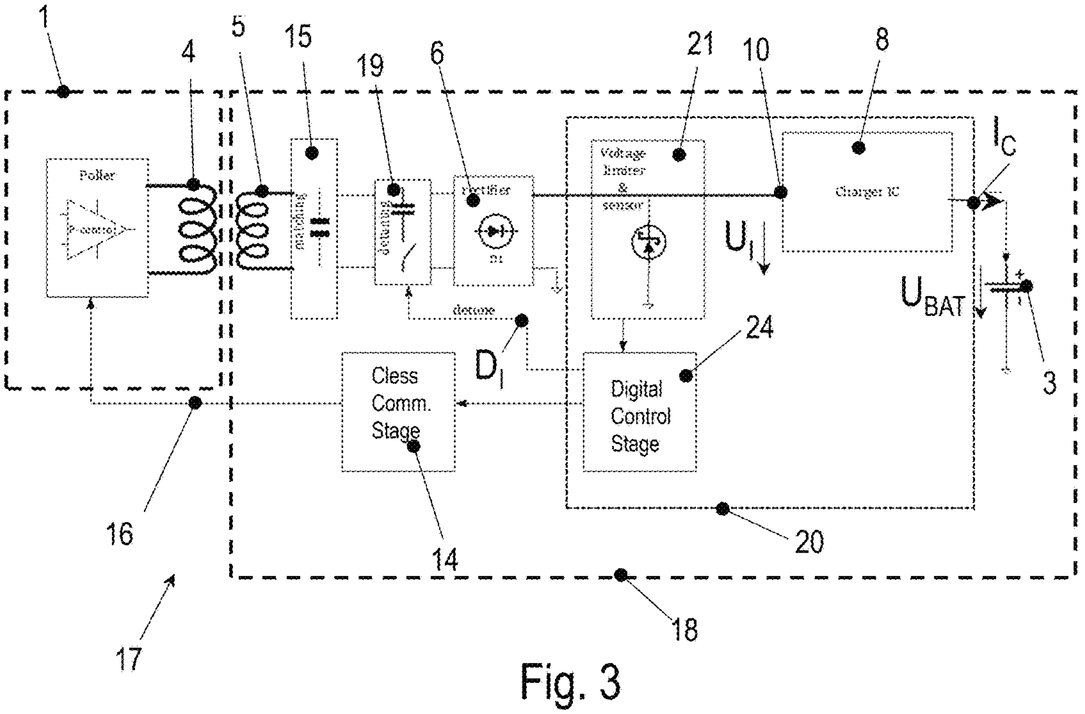
FIG. 3 shows a system according to the invention, which comprises a power device and a portable device with a detuning stage to charge a battery wireless.

FIG. 3 shows a first embodiment of a system 17 of a power device 1 and a portable device 18 with a battery 3 according to the invention. The same reference signs are used for stages that have the same technical function as already described in the system of FIG. 1 known to a person skilled in the art. Power device 1 called "poller" comprises an antenna 4 that radiates a magnetic field with the frequency of 13.56 MHz. Power device 1 could be a charging device connected to the power grid or powered by a battery power pack. Portable device 18 called "listener" comprises an antenna 5 exposed to the magnetic field emitted by power device 1. Portable device 18 could be any device like e.g. earphones or a mobile phone with a wireless interface and a battery 3. A matching circuit 15 matches the impedance of the output pins of the antenna 5 to input pins of a rectifier 6 via a detuning stage 19. Rectifier 6 uses a bridge rectifier to rectify the antenna signal and to provide a DC voltage as input voltage at a charge stage 20. As charge stage 20 comprises a charger IC 8 that needs a power voltage of 5V+/−10% as input voltage $U_I$, a voltage limiter 21 is used to sense the DC voltage provided by rectifier 6 and to limit it to provide the appropriate input voltage $U_I$ at an input pin 10 of charger IC 8.

Battery 3 is a Li-Ion battery that needs to be charged by charge stage 20 in different time periods with different charge currents $I_C$ and charge voltages. Charge stage 20 furthermore comprises a digital control stage 24 that generates a power adjustment information 16 in case the input voltage $U_I$ at input pin 10 and/or the charge current $I_C$ to charge the battery 3 are too low or too high. Such power adjustment information 16 is provided by the digital control stage 24 to a Cless Communication stage 14, which complies to the NFC communication protocol to communicate the power adjustment information 16 to the power device 1. With this feedback loop from portable device 18 to power device 1, charge stage 20 can request more or less power in the magnetic field provided by the power device 1.

Figure 4:
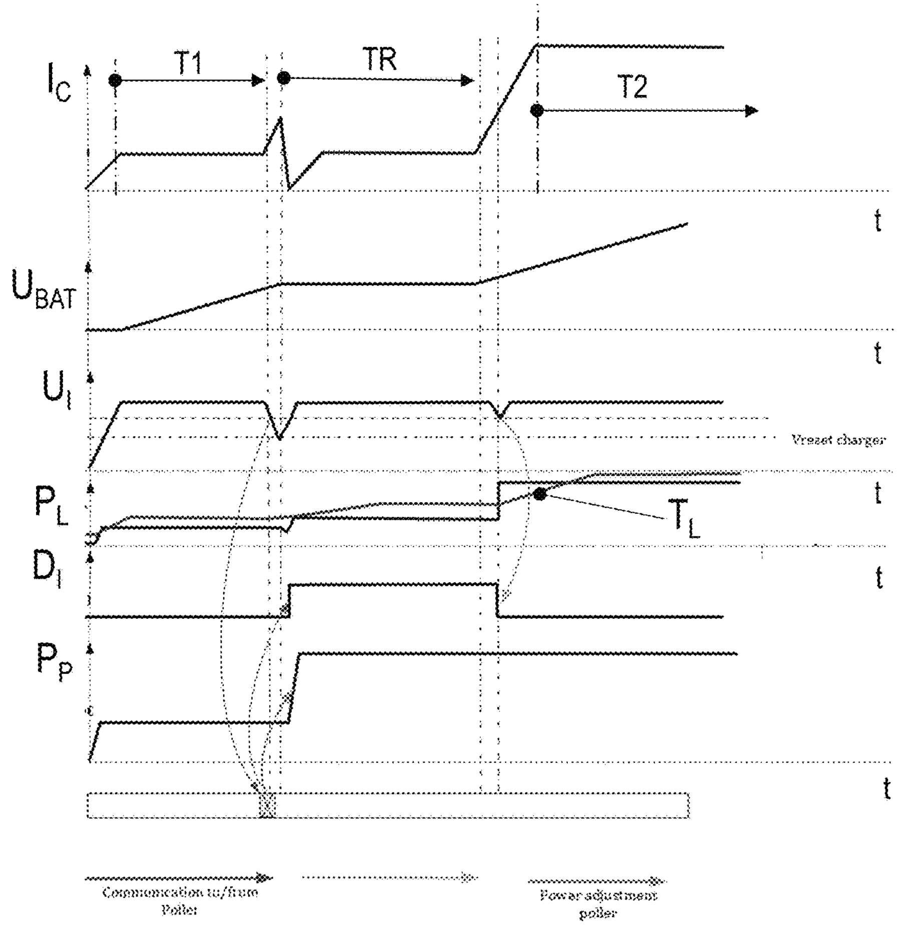
FIG. 4 shows a time diagram of the charge current and other parameters to charge the battery of the portable device of the system according to FIG. 3.

As shown in FIG. 4, battery 3 is loaded by charger IC 8 with constant first charge current Ic, which is about 10% of the maximal charge current Ic to be used for the particular battery 3, during the first time period T1 until $U_{BAT}$ reaches a particular voltage. From this time on Li-Ion battery 3 may be loaded with the higher second charge current Ic, which is close to 100% of the maximal charge current Ic to be used for the particular battery 3, in the second time period T2 until $U_{BAT}$ reaches a target voltage. From this time on loading switches in a third time period to constant voltage charging and charge current Ic is decreasing automatically according to the battery's charging condition until the charger stops charging e.g. when the charging current has decreased to 10% of the maximum charging current. The principle to load a Li-Ion battery in these time periods is known to a person skilled in the art.

At the end of the first time period T1 charge stage 20 ramps-up the charge current Ic, what reduces the input voltage $U_I$ as power $P_L$ generated in the portable device 2 is not enough to load battery 3 in the second time period T2 with the high second charge current Ic. Charge stage 20 therefore transmits a power adjustment information 16 to power device 1 to increase the power $P_P$ generated by the power device 1 in the magnetic field. As this feedback loop takes some time input voltage $U_I$ drops furthermore and reaches a $V_{reset\ charger}$ voltage level what leads to a power-off reset of the charger IC due to too low input voltage $U_I$ what would increase the junction temperature TL as no power is used to charge battery 3 and all power $P_L$ generated would have to be transformed into heat. To avoid that digital control stage 24 is built to steer detuning stage 19 with a detuning information $D_I$ shown in FIG. 4 and FIG. 5 to change the resonance frequency of the antenna of the portable device 18 and therefore is built to limit power $P_L$ and the input voltage $U_I$ for the charger IC 8 by detuning the resonance frequency of the antenna 5. Detuning stage 19 may comprise one or more discrete capacities connected with switches parallel to the matching stage 15 and antenna 5, which capacities change the resonance frequency of the antenna 5. The detuning stage 19 therefore comprises at least two tuning configurations to tune the resonance frequency of the antenna 5 in a first tuning configuration closer to or exact to the carrier frequency of the magnetic field generated by power device 1 to provide a higher power $P_L$ and therefore a higher input voltage $U_I$ at the input pin 10 of the charger IC 8 than in a second tuning configuration with the resonance frequency of the antenna 5 farer away from the carrier frequency of the magnetic field.

Figure 5:
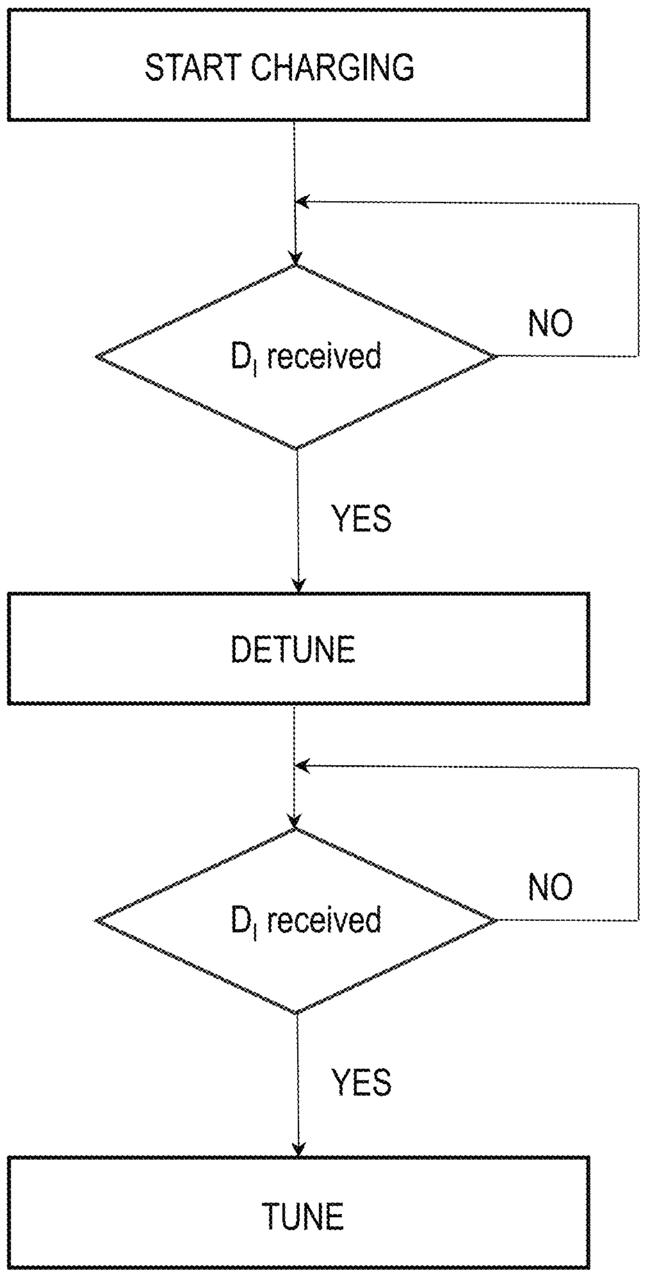
FIG. 5 shows a method according to a first embodiment of the invention.

Due to the upfront communication of the power adjustment information 16 the power device 1 will increase its output power PP. On portable device 2 side this high power $P_L$ would lead to an increase of the junction temperature TL. To overcome that problem the detuning stage 19 changes the resonance frequency of the portable device 2 away from the system resonance frequency and the incoming power $P_L$ will be reduced until the charge state 20 will leave the reset state and come to the point where it is switching again to the high second charge current IC. At this point in time digital control stage 24 is built to steer detuning stage 19 with a detuning information $D_I$ that detuning stage 19 changes again the resonance frequency to the optimum for power transfer as shown in FIG. 5. By means of this de- and retuning during this transition time TR the system 17 can overcome the high junction temperature TL problem.

In the same or another embodiment of the invention charge stage 20 comprises a temperature sensor and wherein the charge stage 20 is built to steer the detuning stage 19 to detune the resonance frequency of the antenna 5 of the portable device 18 away from the carrier frequency of the magnetic field generated by the power device 1, if the sensed temperature $T_L$ reaches a maximum temperature limit. In this embodiment detuning stage 19 is used to ensure that overheat of the portable device 18 and/or charger IC 8 is prevented to avoid damages. As a possible next step charge stage 20 may generate the power adjustment information 16 for the power device 1 to decrease the power of the magnetic field, if the detuning stage 19 had to detune the resonance frequency of the antenna 5 of the portable device 18 to reduce the sensed temperature $T_L$. In another embodiment of the invention the power adjustment information 16 for the power device 1 is generated to decrease the power of the magnetic field, if the detuning stage 19 had to detune the resonance frequency of the antenna 5 of the portable device 18 to reduce the input voltage $U_I$ at the input pin 10 of the charger IC 8.

In another embodiment not covered by this invention two or more portable devices of the system are exposed to the magnetic field of the power device 1 to load the batteries of these portable devices. As all these portable devices may enter the magnetic field at different time instances and all of their batteries may be in different charge conditions, the feedback loop described above with a power adjustment information 16 from the portable device to increase or decrease the power $P_P$ generated by power device 1 in the magnetic field is not possible. Therefore the portable devices have to deal with the power $P_P$ generated by power device 1 as is. To achieve that a method may be used where the detuning stage detunes the resonance frequency of the antenna 5 of the portable device away from the carrier frequency of the magnetic field while the charger IC 8 charges the battery 3 with the first charge current Ic and where the resonance frequency of the antenna 5 of the portable device 18 is tuned to the carrier frequency of the magnetic field while the charger IC 8 charges the battery 3 with the second charge current Ic, which is higher than the first charge current Ic. Assuming that for a typical charging cycle of a battery 3 the battery 3 is never drained so much that the battery 3 has to be charged with the low first charge current Ic for a long time it is possible to start already with the high power $P_P$ state on power device 1 side and detune the portable device 2 to the second tuning configuration from the beginning during the first time period T1. When the digital control stage 24 at the end of the first time period T1 switches to high second charging current Ic, the digital control stage 24 only needs to switch detuning stage 19 to the tuned first tuning configuration state and by that the system 17 can overcome the reset of the charger IC 8 and can decrease the transition time TR without having any temperature issues

The invention claimed is:

1. A system, comprising:

a power device and a portable device, wherein the portable device comprises a battery and the power device is configured to wirelessly charge the battery, wherein the power device comprises an antenna configured to emit a magnetic field with a carrier frequency to power the portable device, wherein the portable device further comprises an antenna operable to provide an antenna signal, a matching stage, a rectifier operable to provide a rectified antenna signal and a charge stage, and wherein said charge stage is configured to sense and limit the rectified antenna signal and wherein said charge stage further comprises a charger IC (Integrated Circuit) including an input pin connected to the rectifier and including an output pin connected to the battery, wherein the antenna of the portable device is configured to be exposed to the magnetic field and connected via the matching stage to the rectifier which operates to rectify the antenna signal to provide an input voltage ($U_I$) at the input pin of the charger IC, wherein the charger IC being configured to provide a first charge current ($I_C$) at the output pin to charge the battery for a first period of time (T1) as power source with a constant first charge current ($I_C$), wherein the portable device comprises a detuning stage to change a resonance frequency of the antenna of the portable device and the charge stage is configured to limit the input voltage ($U_I$) for the charger IC by steering the detuning stage to detune the resonance frequency of the antenna of the portable device away from the carrier frequency of the magnetic field, wherein the system comprises only the one portable device, wherein the power device is configured to receive and process a power adjustment information from the portable device exposed to the magnetic field to increase or to decrease the power of the magnetic field emitted by the antenna of the power device, wherein the charge stage of the portable device is configured to generate the power adjustment information for the power device to increase or to decrease the power of the magnetic field to steer the input voltage ($U_I$) of the charger IC within a voltage range of a technical specification of the charger IC, and wherein the portable device is configured to provide a second charge current ($I_C$) at the output pin of the charger IC to charge the battery for a second period of time (T2) as power source with a constant second charge current ($I_C$) higher than the first charge current ($I_C$) and to provide enough power for the ramp-up from the first charge current ($I_C$) to the second charge current ($I_C$) and the charge stage is configured to send the power adjustment information to the power device to increase the power of the magnetic field and to, at a same time as the power adjustment information is sent to the power device, detune the antenna of the portable device for a ramp-up period of time ($T_R$) to avoid that a junction temperature ($T_L$) sensed by the portable device reaches a maximum temperature limit.

2. The system according to claim 1, wherein the detuning stage comprises two tuning configurations to tune the resonance frequency of the antenna of the portable device in a first tuning configuration closer to the carrier frequency of the magnetic field to provide a higher input voltage ($U_I$) at the input pin of the charger IC than in a second tuning configuration with the resonance frequency of the antenna of the portable device farther away from the carrier frequency of the magnetic field.

3. The system according to claim 1, wherein the charge stage comprises a temperature sensor and wherein the charge stage is configured to steer the detuning stage to detune the resonance frequency of the antenna of the portable device away from the carrier frequency of the magnetic field, if the sensed temperature ($T_L$) reaches the maximum temperature limit.

4. The system according to claim 1, wherein the charge stage is configured to generate the power adjustment information for the power device to decrease the power of the magnetic field, if the detuning stage had to detune the resonance frequency of the antenna of the portable device to reduce the input voltage ($U_I$) at the input pin of the charger IC.

5. The system according to claim 2, wherein the charge stage is configured to switch the detuning stage at the end of the first time period (T1) from the second tuning configuration to the first tuning configuration.

6. The system according to claim 1, wherein the power device comprises a battery power pack configured to provide the power to other components of the power device.

7. A method of using the system according to claim 1, wherein the detuning stage changes the resonance frequency of the antenna of the portable device away from the carrier frequency of the magnetic field to limit the input voltage ($U_I$) for the charger IC.

8. The method according to claim 7, wherein the resonance frequency of the antenna of the portable device is detuned away from the carrier frequency of the magnetic field, if the sensed temperature ($T_L$) reaches the maximum temperature limit.

9. The method according to claim 7, wherein the resonance frequency of the antenna of the portable device is detuned away from the carrier frequency of the magnetic field while the charger IC charges the battery with the first charge current ($I_C$) and that the resonance frequency of the antenna of the portable device is tuned to the carrier frequency of the magnetic field while the charger IC charges the battery with the second charge current ($I_C$), which is higher than the first charge current ($I_C$).

* * * * *